H. S. COOPER.
ALLOY.
APPLICATION FILED FEB. 23, 1918.
1,278,304.
Patented Sept. 10, 1918.
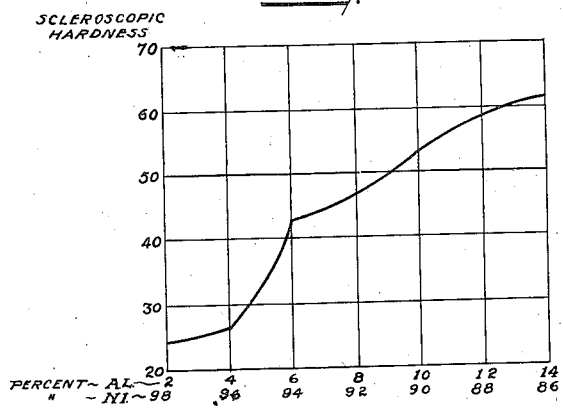
Fig. 1. —ALUMINUM—NICKEL— HARDNESS CURVE
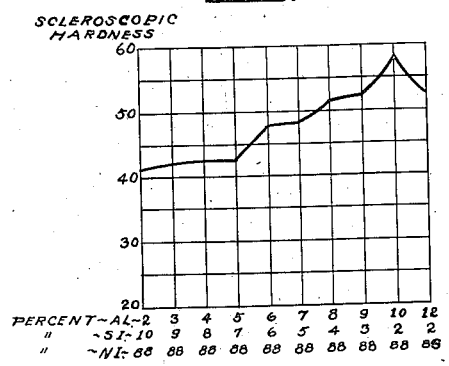
Fig. 2. —ALUMINUM—SILICON—NICKEL— —HARDNESS CURVE—
Inventor
HUGH S. COOPER.
Witness
Geo. E. Kricker.
By Fisher & Woolf
Attorneys ated Sept. 10, 1918.

UNITED STATES PATENT OFFICE.

HUGH S. COOPER, OF CLEVELAND, OHIO, ASSIGNOR TO THE GENERAL ALLOYS COMPANY, OF CLEVELAND, OHIO, A CORPORATION.

ALLOY.

1,278,304.

Specification of Letters Patent.  Patented Sept. 10, 1918.

Application filed February 23, 1918. Serial No. 218,791.

*To all whom it may concern:*

Be it known that I, HUGH S. COOPER, citizen of the United States, residing at Cleveland, in the county of Cuyahoga and State of Ohio, have invented certain new and useful Improvements in Alloys, of which the following is a specification.

The present invention pertains to an alloy having the basic properties of the alloy patented by me on April 3, 1917, No. 1,221,769, but differing in composition and physical and structural characteristics therefrom. Thus, the alloy comprises nickel, zirconium, aluminum, and silicon, and as a preponderating amount of nickel is always used it may be considered as the base of the alloy. However, cobalt may be used in lieu of or with nickel and such substitutes are regarded as equivalent and covered by the term "nickel" as used in the claims.

This alloy is of exceptional utility in its employment to metal cutting purposes, being particularly adapted for intricate tools of all kinds, such as reamers, milling cutters, end mills, also lathe planer and shaper tools, and other machine tools. Furthermore, such tools can be cast from this alloy and are ready for use immediately, that is, they require no heat treatment such as now deemed essential to produce the maximum cutting efficiency in the high speed steels now in use. The reason for this is that the constituents of the alloy are adjusted so that a definite hardness is produced which does not vary under any condition. In other words, the alloy requires no tempering, as no carbon is used to produce hardness. Further, such tools may be cast from this alloy in any desired shape, thereby eliminating machining operations and saving a large amount of time and labor, and in this way greatly lower the production cost as compared with other cutting tool alloys, especially as a grinding operation is only needed to produce finished tools ready for use. A further desirable quality possessed by this alloy is its relatively low melting point of about 1200 C., thus tending still further to reduce the cost by increasing the life of the expensive crucibles used, and also increasing the number of heats possible per day, and it is largely for such reasons that it is possible to make all kinds of intricate tools with great ease. It has also been proven that the cutting efficiency of this alloy is remarkably uniform compared with that of high speed steel alloys. To illustrate, owing to the complex nature of high speed steel alloys, which usually contain iron, carbon, tungsten, chromium, vanadium, silicon, manganese, and sometimes nickel, cobalt and uranium, it is well known that it is practically impossible to produce a uniformity of quality throughout the alloy. In some cases one end of a tool will perform 50 to 100% better than the opposite end, but this is not true of my alloy which has, as stated, a uniform cutting efficiency.

In the present invention I have made use of the metal zirconium which imparts remarkable hardness, toughness and lasting qualities to metal cutting alloys. I also use nickel, aluminum and silicon. For comparative purposes, I have prepared two diagrams, see Figures 1 and 2, in the accompanying drawing, which show the hardness curve of alloys of aluminum-nickel, and aluminum-silicon-nickel, respectively.

The alloys represented in Fig. 1, were made to determine the qualities imparted by aluminum to nickel, such qualities being defined as hardness, toughness, and cutting qualities on steel, if such were possessed. A satisfactory cutting tool must possess a hardness of not less than 55 scleroscopic with combined toughness to answer this purpose. Therefore, it will be seen by the hardness curve of these alloys that to obtain a tool of this hardness a minimum of ten per cent. of aluminum is required. This alloy possesses a fair degree of toughness but can not compare with high speed steel in cutting qualities. With larger amounts of aluminum the alloys become much harder, lose their toughness and strength, and are very crystalline.

The alloys shown in Fig. 2 were made to determine the effect of silicon on alloys of aluminum-nickel, and as shown by the curve the alloys possessing a fair degree of hardness begin with approximately equal parts of silicon and aluminum with the balance nickel. This hardness increases with higher percentages of aluminum and lower percentages of silicon to a maximum at ten per cent. aluminum and two per cent. silicon. It then drops by increasing the percentage of aluminum, with the silicon remaining at two per cent. The only alloys found which possessed sufficient hardness for commercial purposes contained nine per cent. aluminum, three per cent. silicon; ten per cent. aluminum, two per cent. silicon; twelve per cent. aluminum, two per cent. silicon. These alloys were much tougher than the aluminum-nickel series and made better cutting tools but they were still inferior to high speed steel.

However, the addition of from one-half to about fifteen per cent. zirconium to these ternary alloys, greatly improves the physical and structural characteristics of said alloys. The addition of zirconium also increases the red hardness to a remarkable extent, and it is easily possible to produce alloys showing a scleroscopic hardness of from 65 to 75 which are remarkable for extreme toughness and a finely crystalline structure. Moreover such alloys when cast into tools will cut steel continuously under same conditions from 25 to 100 per cent. longer without regrind than the best grades of high speed steels.

These alloys can be produced very easily by reduction with powdered aluminum. For example, approximately 66 pounds of nickel oxid, black, and 36 pounds of Brazilian zirkite carrying a minimum of about 80 per cent. zirconium oxid and about 15 per cent. silica, may be ground to 200 mesh, sifted, dried and thoroughly blended with about 32 pounds of 200 mesh aluminum. This mixture is next transferred to a crucible of the cone type which has been previously lined with magnesia or alumina. The mixture is then ignited with magnesium ribbon or any other suitable means or method. Immediately after the reaction, the alloy may be tapped from the base of the crucible, or it may be allowed to solidify in the crucible in which latter case it is cracked from the slag which is formed. The cone-shaped ingot is then remelted and standardized before pouring into molds.

These alloys must be poured into molds which allow a slow rate of cooling, such as sand, graphite or carbon molds and of these carbon is much preferred.

If the above mixture is used an ingot will be obtained weighing about 75 pounds and of the following approximate analysis: aluminum—10.93, silicon—4.96, iron—3.00, zirconium—8.49, nickel—73.12. This composition will show a scleroscopic hardness of from 85 to 90 but does not possess sufficient strength to be used for cutting tools; therefore, more nickel is added to reduce the hardness and toughen the product.

Thus about 24% metallic nickel is added to the aforesaid alloy to obtain a hardness of 63 and produce the requisite toughness.

Preferably alloys of the quatenary type may contain from one to ten per cent. silicon, one to twelve per cent. aluminum, one to twenty per cent. zirconium, with the balance nickel.

For a more specific disclosure of an alloy of exceptional utility, see the table below:

| | |
|---|---|
| Aluminum, approx. | 8.36 |
| Silicon, approx. | 3.80 |
| Zirconium, approx. | 6.84 |
| Nickel, approx. | 81.00 |

I have also found that small amounts of one or more of the metals of the chromium group may be beneficially added to the aforesaid alloys and still further improve the cutting efficiency of a cutting tool made therefrom, all substantially as shown and described and claimed in my divisional application Ser. No. 229,173, filed April 17, 1918.

What I claim is:

1. An alloy, comprising a preponderating amount of a hard, malleable, ductile, metallic element of the iron group, which is resistant to oxidation, in union with a small amount of zirconium, and one to twenty per cent. of aluminum and silicon combined.

2. An alloy, comprising a preponderating amount of nickel, one-half to twenty per cent. of zirconium, together with relatively small amounts of aluminum and silicon.

3. An alloy, comprising nickel in a preponderating amount, together with zirconium, aluminum, and silicon.

4. An alloy, comprising a preponderating amount of nickel, together with relatively low percentages of zirconium, aluminum and silicon.

5. An alloy, comprising nickel in a preponderating amount, aluminum, and silicon, together with one-half to fifteen per cent. zirconium.

6. An alloy, comprising one to twenty per cent. zirconium, one to twelve per cent. aluminum, one to ten per cent. silicon, and a preponderating amount of nickel.

7. An alloy, comprising a relatively high percentage of nickel and approximately six to twelve per cent. of aluminum, six to ten per cent. of zirconium, and two to six per cent. of silicon.

8. An alloy, comprising, approximately, eighty-one per cent. of nickel, eight to nine per cent. of aluminum, six to seven per cent. of zirconium, and three to four per cent. of silicon.

Signed at Cleveland, in the county of Cuyahoga, and State of Ohio, this 19th day of February, 1918.

HUGH S. COOPER.